Patented Mar. 1, 1927.

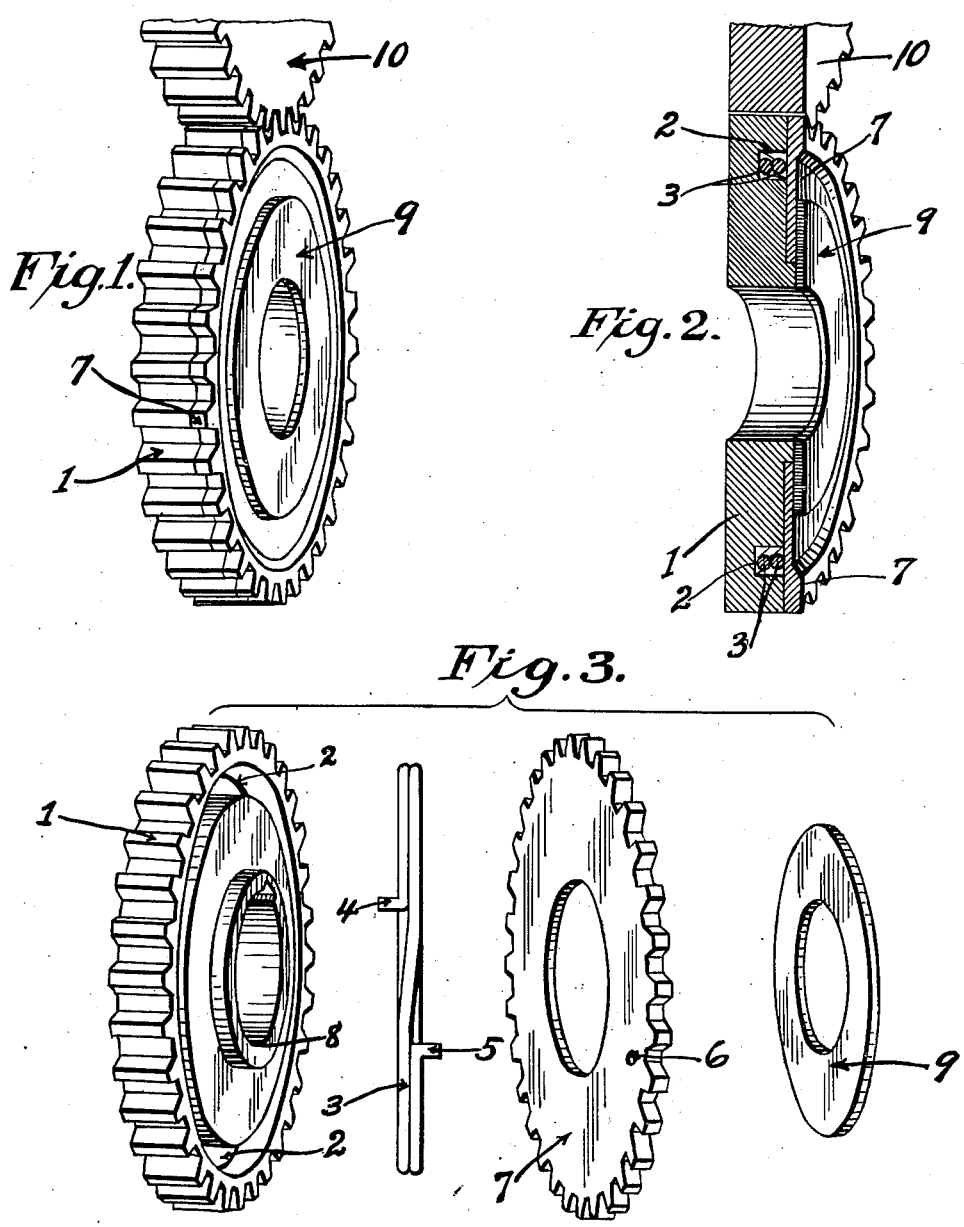

1,619,799

UNITED STATES PATENT OFFICE.

CHARLES W. ROUNDS AND JOHN C. ROUNDS, OF SEATTLE, WASHINGTON.

NONCHATTERING GEAR.

Application filed September 23, 1924. Serial No. 739,315.

The invention relates to improvements, in gear trains, in which one or more gears of the train is an assembled gear containing a coil spring, the object being to eliminate back-lash or chatter.

One form of the invention is illustrated in the accompanying drawing in which Fig. 1 is a complete drawing of the gear assembled. Fig. 2 is a cross-section of the same. Fig. 3 is a drawing of the gear disassembled.

1 of Fig. 3 is a main gear with a groove 2, cut in the side to receive spring 3, with point 4, of spring 3, inserted in a hole in bottom of groove 2, in gear 1, and point 5, of spring 3, inserting in hole 6, of gear 7, and projection 8, of gear 1, forming a bearing for gear 7, and washer 9, follows up on the shaft, holding gear 7 in place on gear 1, washer 9 being backed up by means of shoulder on shaft, or nut, or by being capped-screwed thru gear 7, in slotted holes in gear 1, and when assembling the assembled gear with the next gear of the train (10 Fig. 1), wind up spring 3, Fig. 3, by turning gear 7 ahead as many teeth on gear 10, Fig. 1, as desired, to hold out the back-lash or chatter, accomplished by the teeth of gear 7, holding a pressure, set up thru spring 3, on the opposite side from the drive of the teeth on gear 10, Fig. 1.

We claim—

A noiseless gear, comprising a main gear section formed in one face with an annular concentric channel and with a concentric flange extending beyond said face axially of the gear section, the face of the gear section between the channel and flange presenting a plane surface, an auxiliary gear section of similar tooth number and pitch to the main gear section and formed with a central opening to fit over said flange, said auxiliary gear section bearing squarely on the plane surface of the main gear section and overlying and covering said channel, and a spring arranged in coils and having one axially directed terminal extended in one direction and a diametrically opposed axially directed terminal extended in the opposite direction, said spring being seated in the channel with one terminal removably fitted in an opening in the base of the channel and the other terminal removably fitted in an opening extending through the auxiliary gear section, a washer fitted over the flange and overlying and concealing the opening in the auxiliary gear section, and means cooperating with the flange to hold the parts in connected relation.

C. W. ROUNDS.
J. C. ROUNDS.